No. 685,421. Patented Oct. 29, 1901.
J. A. GROEBLI.
COUNTERBALANCING DEVICE FOR EMBROIDERING MACHINES.
(Application filed Oct. 18, 1900.)
(No Model.) 6 Sheets—Sheet 1.

Fig. 1.

WITNESSES:

INVENTOR
Joseph A. Groebli.
BY
ATTORNEYS

No. 685,421. Patented Oct. 29, 1901.
J. A. GROEBLI.
COUNTERBALANCING DEVICE FOR EMBROIDERING MACHINES.
(Application filed Oct. 18, 1900.)
(No Model.) 6 Sheets—Sheet 3.

WITNESSES:

INVENTOR
Joseph A. Groebli
BY
ATTORNEYS

No. 685,421. Patented Oct. 29, 1901.
J. A. GROEBLI.
COUNTERBALANCING DEVICE FOR EMBROIDERING MACHINES.
(Application filed Oct. 18, 1900.)
(No Model.) 6 Sheets—Sheet 5.

WITNESSES:
INVENTOR
Joseph A. Groebli
BY
ATTORNEYS

No. 685,421. Patented Oct. 29, 1901.
J. A. GROEBLI.
COUNTERBALANCING DEVICE FOR EMBROIDERING MACHINES.
(Application filed Oct. 18, 1900.)
(No Model.) 6 Sheets—Sheet 6.

WITNESSES:

INVENTOR
Joseph A. Groebli.
BY
ATTORNEYS

UNITED STATES PATENT OFFICE.

JOSEPH A. GROEBLI, OF NEW YORK, N. Y., ASSIGNOR TO THE KURSHEEDT MANUFACTURING COMPANY, OF NEW YORK, N. Y., A CORPORATION OF NEW YORK.

COUNTERBALANCING DEVICE FOR EMBROIDERING-MACHINES.

SPECIFICATION forming part of Letters Patent No. 685,421, dated October 29, 1901.

Application filed October 18, 1900. Serial No. 33,445. (No model.)

*To all whom it may concern:*

Be it known that I, JOSEPH A. GROEBLI, a citizen of the United States, residing in the city, county, and State of New York, have invented certain new and useful Improvements in Counterbalancing Devices for Embroidering-Machines, of which the following is a specification.

My invention relates to devices for efficiently balancing the fabric-frames of embroidering-machines and is of the same general class as the machine described and claimed in United States Letters Patent No. 593,206, issued November 9, 1897, to the Kursheedt Manufacturing Company as my assignee.

In the accompanying drawings and in this specification I have disclosed by way of example one form of machine in which my invention is embodied, and in the claims at the end hereof I have set forth the salient features of the invention.

Broadly speaking, the invention comprises an embroidering-machine structure having a tension counterbalancing means for the fabric-frame, such as a spring, and means for maintaining a certain normal tension of the spring which balances the fabric-frame.

In the drawings, Fig. 2ª is a sectional view of a part of Fig. 2 on line *a a* of said Fig. 1. Fig. 2ᵇ is a section through the driving-wheel on line *b b* of Fig. 2. Fig. 3ª is a sectional view of a portion of the mechanism, the section being taken on the line *c c* of Fig. 2. Fig. 10 is a plan view of the end of lever 26, hereinafter referred to.

Figure 1:
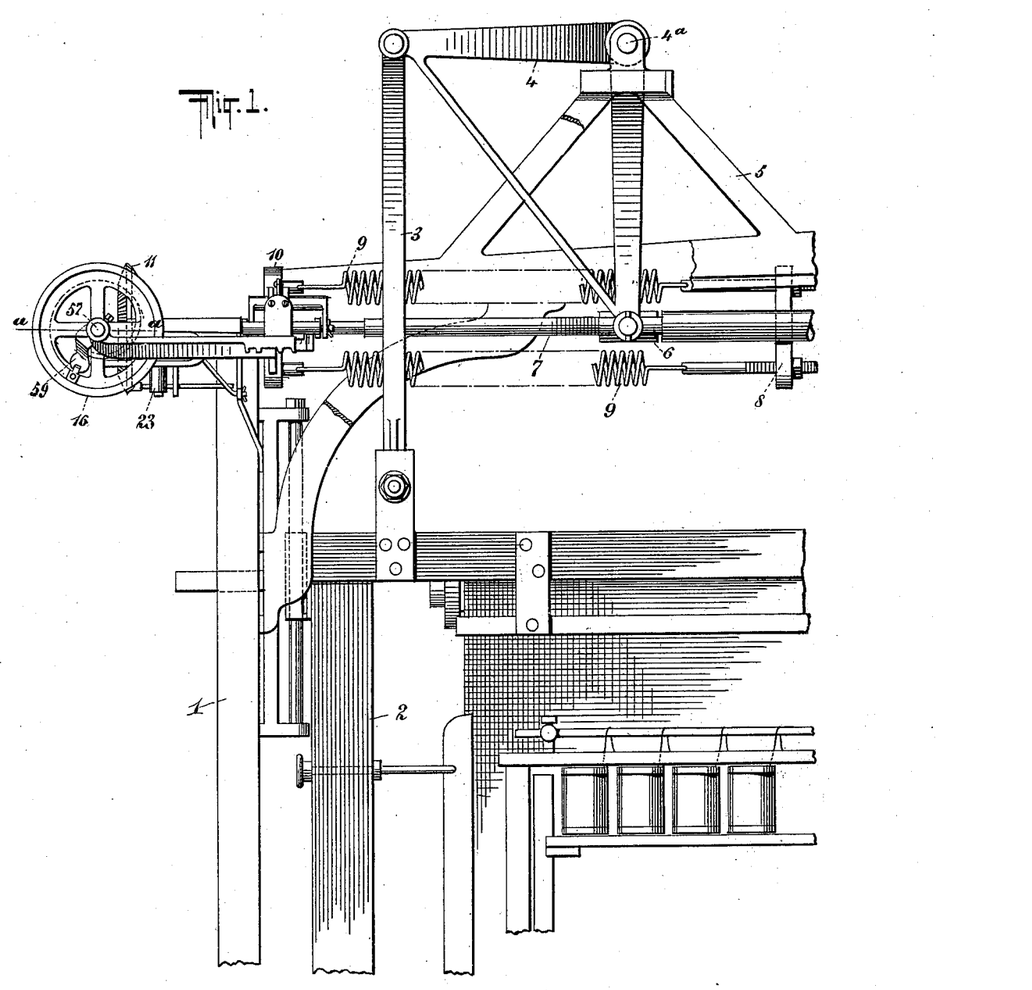
Figure 1 shows the upper left-hand end of an embroidering-machine with my improvements applied thereto.
Figure 12:
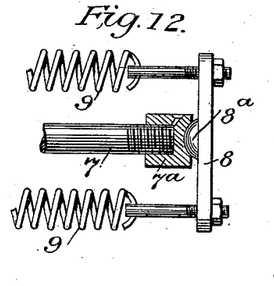
Fig. 12 is a detail sectional view of the construction by which the screw-shaft 7 and cross-head 8 are connected.

In the drawings, 1 represents the framework of the embroidering-machine, and 2 represents the fabric-frame. This fabric-frame is suitably supported by links 3, of which there are usually more than one, constituting a parallel-motion device, as is shown in Letters Patent No. 593,206, above referred to. Each of the links is pivoted at one end to the fabric-frame and at the other end to a bell-crank lever 4, pivoted at 4ª upon the bracket 5 of the embroidering-machine frame. The other end of the bell-crank lever 4 is pivotally secured to a nut 6, through which passes a screw-threaded shaft 7. The shaft 7 imparts a thrust to the cross-head 8, to which the counterbalancing-springs 9 of the fabric-frame are secured. The shaft 7 rests loosely in a shell or socket 7ª, but is not screw-threaded therein, and rotates freely in the said shell or socket. This shell or socket 7ª is recessed at its rear end to receive a knuckle 8ª, carried on the cross-head 8. The knuckle rests in the recess. The shell-and-knuckle construction, which is fully show in Fig. 12, permits the parts to move freely on each other. These counterbalancing-springs are secured at their other ends to a cross-head 10, which is secured to the framework of the embroidering-machine. The object of these springs is to counterbalance the fabric-frame. It will be obvious that if the fabric-frame makes a long movement or a series of short movements in one general direction the tension upon these springs will increase or decrease in proportion to the movement, and therefore the frame will be no longer truly counterbalanced, and if a series of short movements be made while the fabric-frame is in an abnormal position at the end of its long movement considerably more work will be thrown upon the jacquard mechanism, which operates the frame, or upon the pantograph, and owing to this unusual stress the work will be inaccurate. In order to overcome these defects, I have devised an improved means for adjusting the tension of the springs when the frame is in an abnormal position which will at all times operate noiselessly.

Figures 2, 2A, 2B:
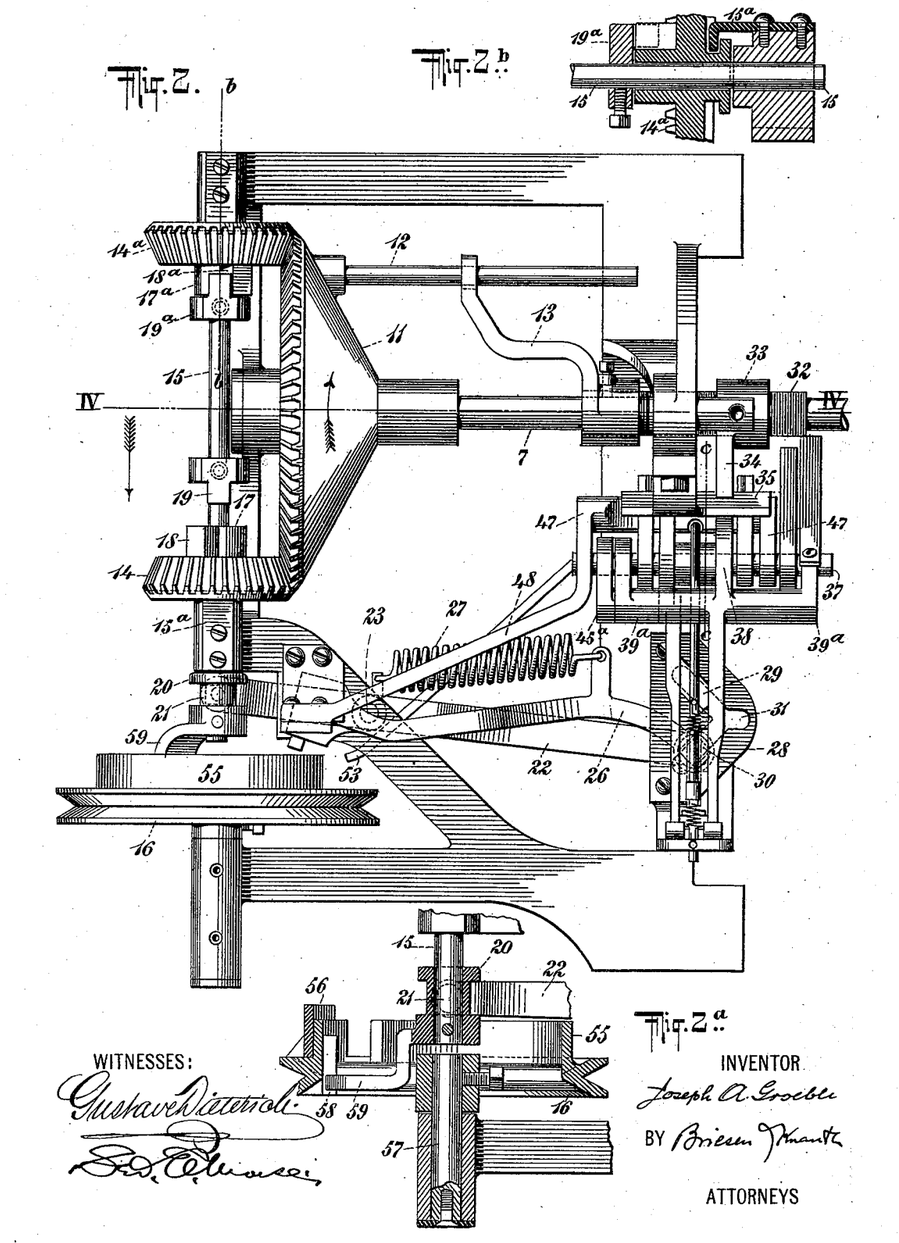
Fig. 2 is a plan view of the counterbalancing mechanism on a larger scale than in Fig. 1.
Figure 7:
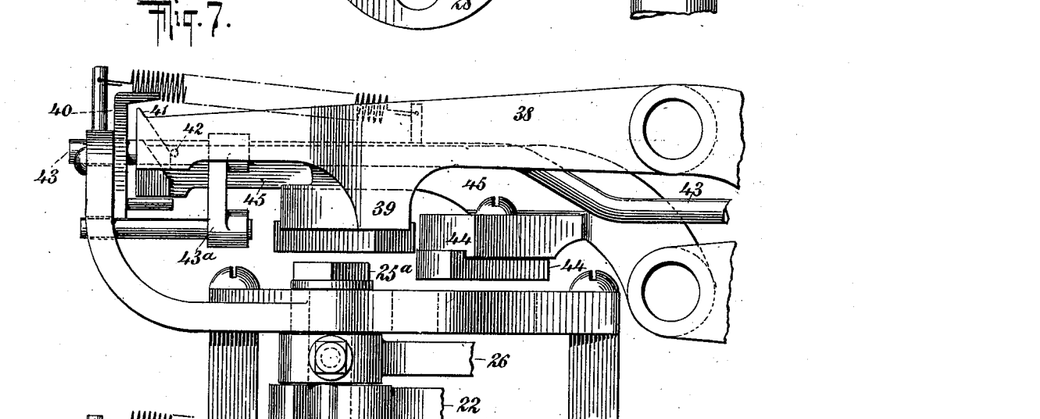
Figs. 7 and 8 are end views thereof in two different positions.
Figure 8:
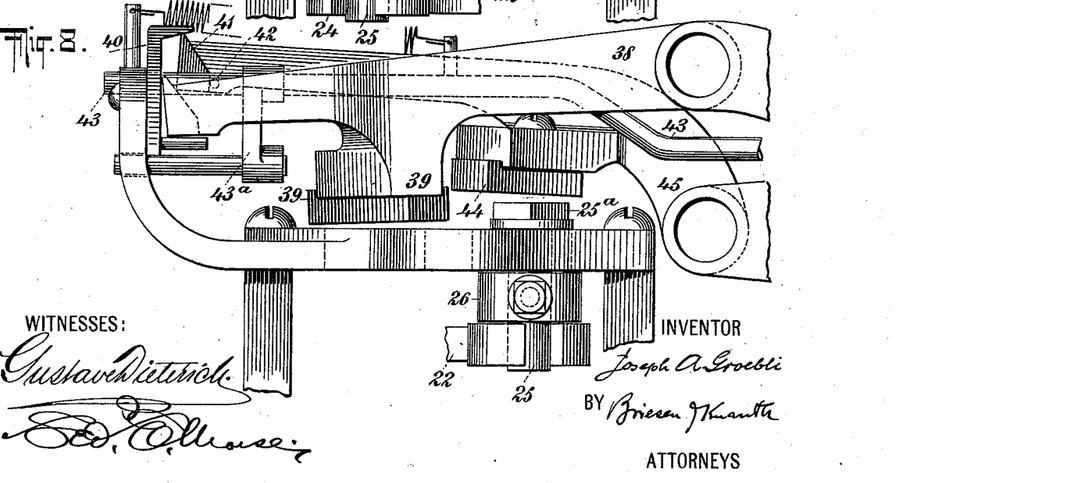

One form of my invention which is illustrated in the drawings will be described in detail. The shaft 7 enters freely into the collar of a conical spur crown-wheel 11. This crown-wheel 11 is provided with a rigid rod or guide 12, with which a yoke 13, carried rigidly upon shaft 7, engages. The wheel 11 thus rotates with the shaft 7, and as the moving fabric-frame imparts a longitudinal reciprocating movement to the shaft 7 the rod 12 and yoke 13 serve to maintain a sliding connection between the said shaft and the wheel 11. The wheel 11 meshes with two bevel-pinions 14 and $14^a$, which are loose upon a shaft 15, to which a driving-wheel 16 is coupled, (in a manner to be described,) which driving-wheel 16 is driven continuously in one direction by a suitable belt. (Not shown.) Each bevel-pinion 14 $14^a$ is provided with a collar 17 $17^a$, having a lug 18 $18^a$ integral therewith. The shaft 15 is provided with a pair of lugged collars 19 $19^a$. By moving the shaft longitudinally in one direction or the other one of the lugs 18 or $18^a$ is engaged by the lug of one of the collars 19 or $19^a$, so as to transmit motion from one bevel-gear or the other to the wheel 11, so that as the shaft 15 revolves always in one direction the shaft 7 may be made to revolve in one direction or the other, and thereby by means of its screw-threaded portion will shift itself in the nut 6 to increase or decrease the amount of stretch of the springs. It will be observed that the lugs, in combination with the other mechanism, constitute clutches. Fixed fingers $15^a$ (see Fig. $2^b$) maintain the pinions 14 $14^a$ from moving longitudinally with the shaft. It is obvious that if the shaft 7 be moved by rotation in nut 6 longitudinally independently of its movement, due to the movement of the fabric-frame, the tension upon the springs 9 will be changed, and thus means are thereby provided for restoring the spring to its normal tension when the fabric-frame is in an extreme position. The increase and relaxation of tension on the springs is effected and determined by the longitudinal movement of the shaft 7 and the nut 6. If the fabric-frame makes a long movement or a series of short movements on one line, the shaft 7 will be thereby also given a long longitudinal movement or a series of short movements, which by means of mechanism presently to be described will throw one or the other pinions 14 or $14^a$ into action to shift the shaft 7 in the nut 6, as above explained. In this manner the compensation may be effected. A long movement of the fabric-frame, which will set the adjusting mechanism into action, and a series of short movements in one line, which will have the same effect, are hereinafter called by me "abnormal" movements to distinguish them from the short movements of the fabric-frame, which produce no such effect, the word "abnormal" being used with respect to the balancing mechanism and not to the fabric-frame. The shaft 15 is provided with a collar 20, rigidly fixed thereon, in which collar a pin 21, carried by a lever 22, enters. The lever 22 is pivoted at 23 and serves to shift the shaft 15 laterally to engage one or the other of the lugged collars 19 or $19^a$ with the lugged collars of the bevel-pinions 14 or $14^a$. It will be observed that each lugged collar of the shaft and its coöperating lugged collar of the bevel-pinions together constitute clutches. The free end of the lever 22 is provided with a fork 24, which embraces a pin 25, secured to a resetting-lever 26, which is actuated by a spring 27. (See Figs. 2, 7, and 8.) The pin 25 works in a plate 28, provided with a Y-shaped slot having the arms or branches 29, 30, and 31. Normally the pin 25 rests in the slot 31 at the junction of the slots 29 and 30. When the pin is in this position, the spring 27 is under extreme tension, and when the pin is released either on one side or the other it will be impelled by the stress of the spring 27 down the slot 29 or 30 on the side upon which it is released and the spring-and-lever system just described will be operative to throw the shaft 15 into one position or the other. Thus if the pin be impelled down the slot 30 the arm 22 will so shift the shaft 15 as to engage the clutch members or lugged collars $19^a$ and $18^a$. If the pin be impelled down the slot 29, the opposite result will occur and clutch members 19 and 18 will be engaged. The means for determining the direction of shift of the lever 22, and consequently the shifting of the shaft 15, which shifting determines the direction of rotation of the wheel 11, will now be described.

Figures 3, 3A:
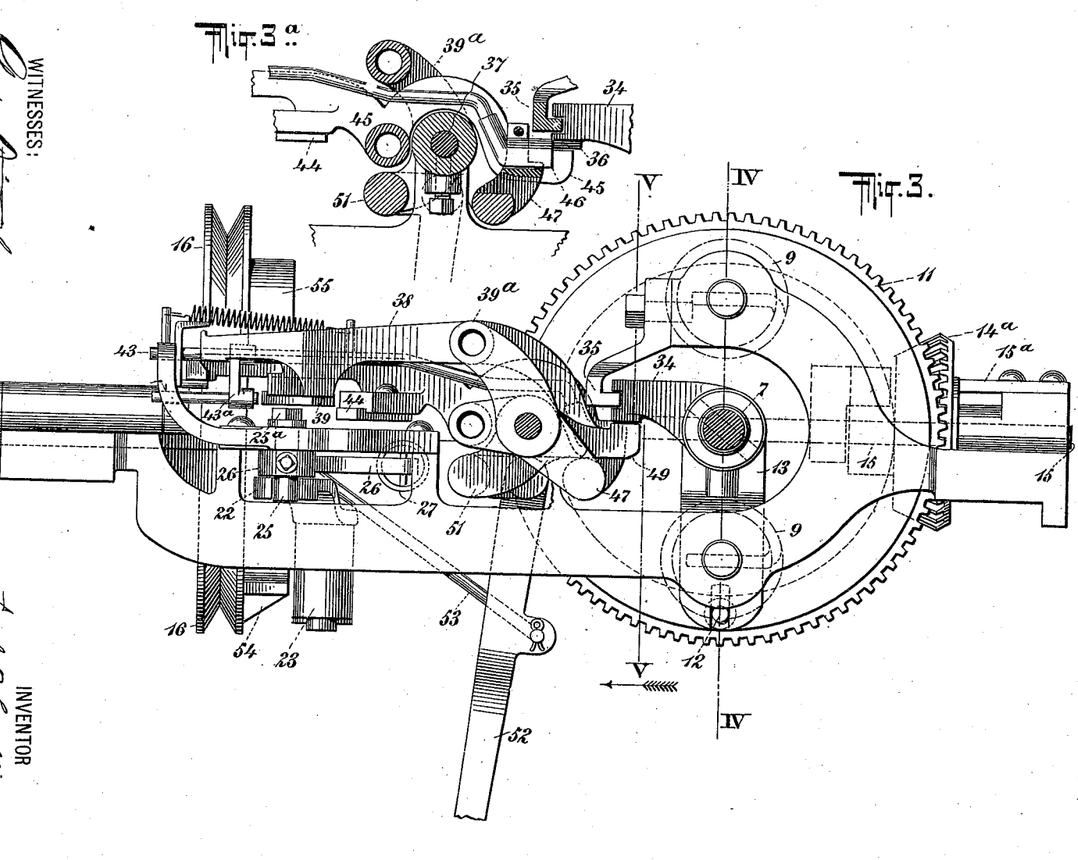
Fig. 3 is a side elevation of the balancing mechanism, partly in section, looking from the right of Fig. 2.
Figures 4, 5:
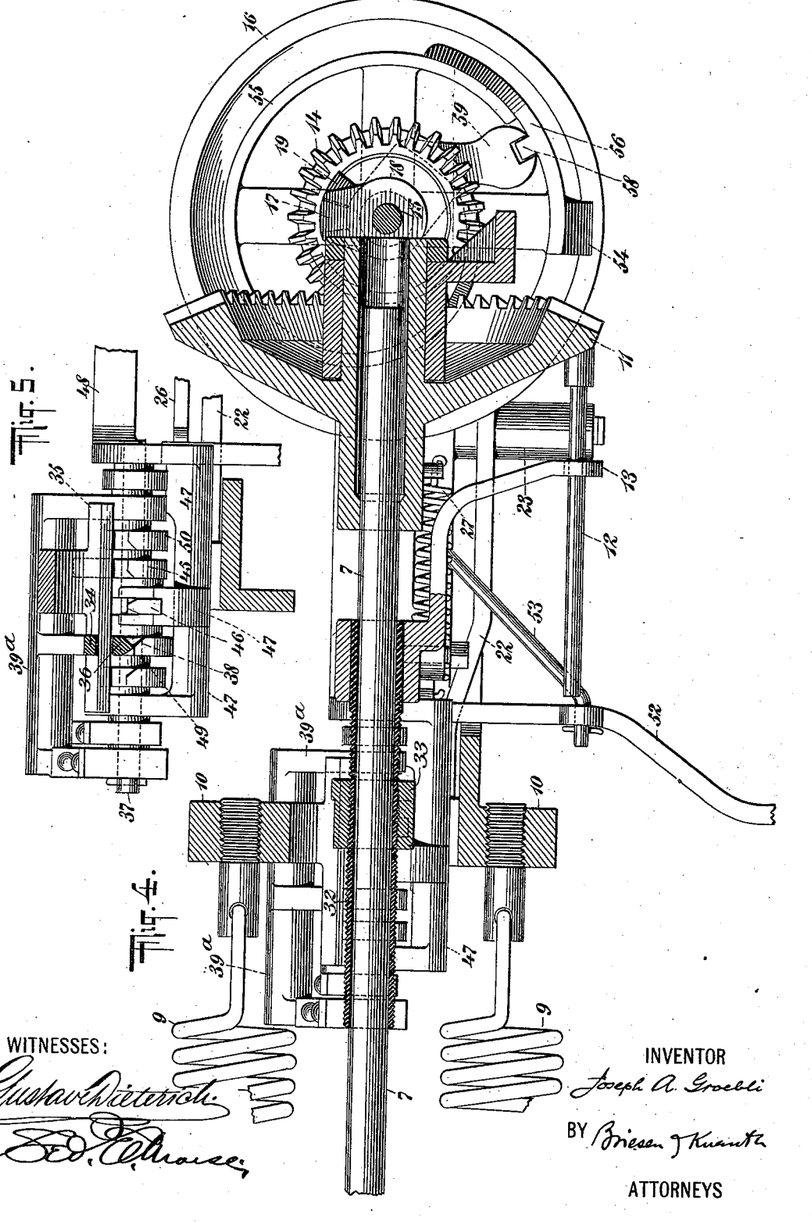
Fig. 4 is a longitudinal section of the compensating mechanism, taken on the line IV of Fig. 2.
Fig. 5 is an end view, partly in section, of the tripping-levers, which will be hereinafter described.
Figure 9:
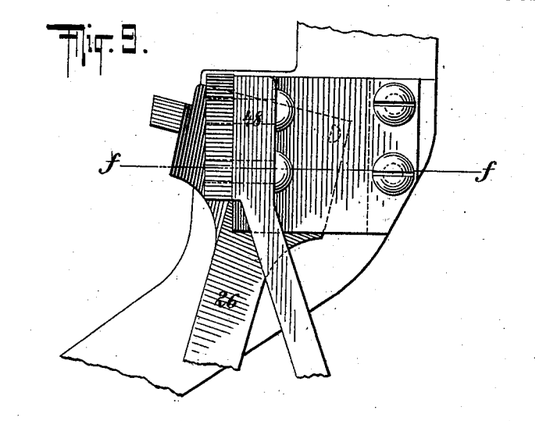
Fig. 9 is a plan view of a portion of the interlocking clutch-shifting devices.
Figure 10:
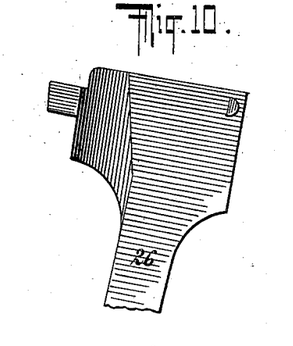
Figure 11:
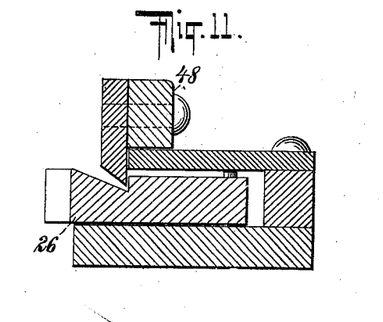
Fig. 11 is a section on line *f f* of Fig. 9.

The shaft 7 is provided with a very fine screw-thread 32, which works in a threaded collar 33, carrying an arm 34. The purpose and function of this screw-threaded arrangement will be described later. For the present the collar 33 may be considered as perfectly stationary on the shaft 7, but not rotating with the shaft. The arm 34 has a slotted face, (see Fig. $3^a$), which slot receives the edge of a guide 35, (see Fig. 5,) mounted upon the framework of the adjusting device. This guide is very clearly shown in Figs. 2, $3^a$, and 5. The arm 34 is likewise provided with a wedge-shaped portion 36, (see Fig. 5,) presenting two cam-faces adapted to depress tripping-levers. The arm 34 partakes of the longitudinal movements of the shaft 7 and coöperates with a series of tripping-levers, whose functions and operations will now be described, special reference being had to Figs. 2, 3, $3^a$, and 5. A rod 37 carries a series of tripping-levers loosely hung thereon. One of these tripping-levers 38 is loosely hung upon the rod 37 by means of a U-shaped yoke $39^a$. The tripping-lever 38 extends rearwardly and is provided with a block 39, adapted to act as a stop for the squared upper end of the pin 25. The tail of the lever 38 vibrates against a stop 40 and is provided with a cam 41, which is adapted to strike against a pin 42 (see Fig. 7) on a spring-retracted slide 43, which is guided by guide 43$^a$ and projected forward by the cam when the tripping-lever 38 is actuated and remains in this position until the tail of lever 38 drops. The block 44, similar to the block 39 and operating as a stop for the squared head 25$^a$ of the pin 25, is carried upon another tripping-lever 45, carried by a yoke 45$^a$, which is similar in construction and operation to the lever 38. The inner ends of the levers 38 and 45 are beveled, as most clearly shown in Fig. 5, so as to be depressed by the cam-faces of the arm 34. It will be obvious that the arm 34, moving with the shaft 7 in one direction or the other, will trip the lever 38 or 45, and thereby raise the block 39 or 44 and permit the spring 27 to draw the end of the lever 22 in one direction or the other, accordingly as the block 39 or 44 has been removed from the path of the squared end of the pin 25. It will thus be seen that abnormal movements of the fabric-frame will be effective to depress either one tripping-lever or the other, and thus set in action the appropriate gear to drive the wheel 11 and shaft 7 to effect the shifting of the shaft in the nut 6 to alter the tension upon the springs 9, and consequently balance the fabric-frame more accurately. The spring-retracted slide 43 is provided at its forward end with a block 46, forming part thereof and having a double-beveled face adapted to be acted upon by the double-beveled cam-face of the arm 34. This block is shown clearly in Fig. 3$^a$. The block 46 slides back and forth in a guide of a yoke 47, which is pivoted on the rod 37 and is provided with a laterally-extending arm 48. (See Figs. 2 and 5.) The arm 48 is adapted to lock the arm 26 in its normal position against lateral movement. Adjacent to the tripping-levers 38 and 45 are levers 49 and 50, which levers are secured at the rear to yoke 51, to which is secured an arm 52, which is provided with a stop-lever 53, extending into the path of an abutment 54 (see Figs. 3 and 4) on the driving-wheel 16 of the apparatus. This lever is also adapted to be connected to the stop-motion of the embroidering-machine or other part. When the bevel or cam face of the arm 34 comes upon the block 46, it will be effective to rock the yoke 47 to operate the arm 48 to release the arm 26. When the cam-face of the arm 34 comes in contact with the levers 49 or 50 upon an extraordinary movement of the fabric-frame, it will be effective to rock the yoke 51, and thereby operate the stop-motion. The driving-wheel 16 is provided with a snail-cam 55, which terminates in a side cam 56, which bears against the side of the lever 26 to force it laterally at the proper time to restore it to position, interlocking with arm 48, as shown in Figs. 9 and 11. The wheel 16 is mounted rigidly upon a short shaft 57 and is provided with an internal rib 58, which is engaged by an arm 59, carried upon the laterally-movable shaft 15, so that the lateral movement of the shaft will not affect the connection between itself and the wheel 16.

Figure 6:
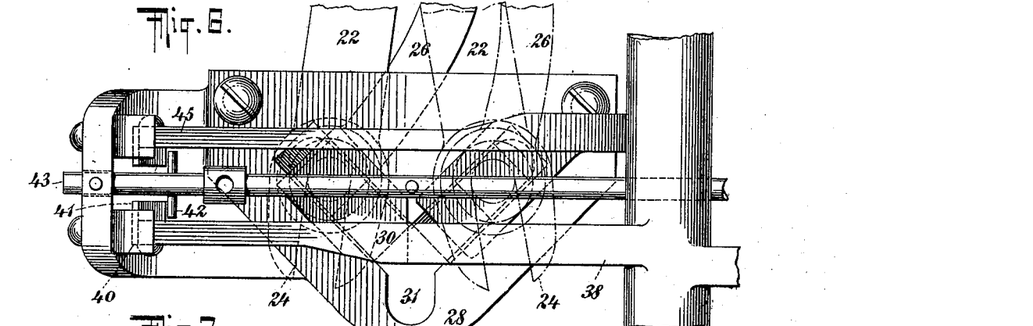
Fig. 6 is an enlarged plan view of the means for governing the throw of the shifter for the shaft 15, as will be explained.

The detailed operation of the device is as follows: Let it be supposed that the pin 25 is at the junction-point of the slots 29, 30, and 31 and in line with the slot 31. We will also suppose that the arm 34 is between the block 46 and the lever 38. (See Fig. 5.) As the fabric-frame moves and gets into one of its abnormal positions the lever 34 will move with the shaft 7 and come into contact with the arm 38, whose forward end will be depressed, thereby lifting its rear end and bringing the cam 41 into contact with the pin 42 and forcing the slide 43, with its block 46, forward. The effect of raising the rear end of the lever 38 is to remove the block 39 from the path of the squared end 25$^a$ of the pin 25, thereby permitting the pin 25 to move into the slot 30, which allows the spring 27 to throw the arm 26 forward without releasing it from its locking arm or lever 48 and to swing the arm 22 on its pivot, thereby moving the shaft 15 longitudinally in a direction opposite to the direction of the arrow in Fig. 2, so as to bring the lugged collar 19$^a$ of the shaft 15 into contact with the lugged collar 18$^a$ of the pinion 14$^a$. (See Fig. 2.) The crown-wheel 11 is thus driven in the direction of the arrow which appears on the said crown-wheel in Fig. 2. The rotation of the shaft 7 will be effective to change the tension of the springs 9 to restore the exact counterbalancing effect of the fabric-frame. All this time the free end of the lever 26 is held from lateral movement by the end of the lever 48. It will be understood that as the shaft rotates it also moves longitudinally in the nut, and consequently its longitudinal movement will carry the arm 34 in the direction opposite to that which it moved and will bring the said arm into contact with the double-face block 46, which has been thrust forward into the return-path of the arm 34 by the action of the cam 41 (see Figs. 6, 7, and 8) on the pin 42. As the arm 34 strikes the block 46 the downward movement of the block 46 will depress the yoke 47, thereby swinging the same downward and lifting the lever 48, which will thereupon permit the free end of the arm 26 to be released and moved laterally by the tension of spring 27 into the path of the snail-cam 55 on the wheel 16. As the wheel 16 continues to revolve the snail-cam will force the arm 26 longitudinally and bring the pin 25 into the slot 31, whereupon the stop-block 39 will drop and lock the block 25$^a$ at the junction of the slots 29 and 30. The cam 56 on wheel 16 now comes into action and moves the free end of the lever 26 laterally until it drops behind the free end of the locking arm or lever 48 and is thereby locked in place. At the same time that the snail-cam moves the lever or arm 26 it also transmits motion through the arm 26 to the arm 22, thereby unclutching the clutch elements—to wit, the lugged collars or dogs. The parts will then be restored to their normal positions, and in this connection it is to be noted that when the parts are in their normal positions the slide 43 is retracted by its spring and the block 46 is slid rearwardly thereby, so as to be out of the path of the moving arm 34. This block 46 is, in effect, the operating portion of the locking mechanism and is thrown into position for action by the depression of the forward end of the trip-lever 38. When the fabric-frame makes a dangerously extreme movement, the stop mechanism is thrown into action. This is accomplished as follows: The arm 34 comes into contact either with the tripping-lever 49 or 50. This will be effective to rock the yoke 51, thereby swinging the lever 52 in the direction of the arrow in Fig. 3 and interposing the end of the stop rod or bar 53 into the path of the abutment 54 on the wheel 16. The screw-thread 32 on the shaft 7, with which the collar 33 of arm 34 is engaged, is for the purpose of compensating for the irregularities in the action of the bell-crank levers when they are in different positions. This irregular action arises as follows: It is obvious that as the bell-crank levers swing on their pivots and shift their centers of gravity the amount of work required to balance them depends upon the position of their centers of gravity. These irregularities are compensated for in the following manner: The rotation of the shaft 7 in effecting the restoration of the spring to its normal tension has the effect of shifting the shaft 7 in the arm 34 so as to position the said shaft with respect to the said arm 34 in accordance with the variation of position of the center of gravity of the bell-crank lever. In this way the time of the tripping action of said arm 34 is changed in such manner as to compensate for the change in the position of the center of gravity of the bell-crank levers.

Having described my invention, what I claim, and desire to secure by Letters Patent, is—

1. A compensating spring counterbalancing device comprising in its structure means for changing the tension of the spring comprised in part by a clutch with interlocking means independent of the clutch for setting the same into operation and for restoring the parts to their initial positions.

2. In an embroidering-machine, the combination of a balanced movable part and means for adjusting the tension, comprising in its structure the combination of a rotary device adapted to be brought into engagement with means for producing motion in opposite directions and a locking device for maintaining the said last-mentioned means out of operation.

3. In an embroidering-machine, the combination of a counterbalanced fabric-frame, means for varying the tension on the frame, means for locking the tension-varying means out of operation and means for releasing the locking mechanism to effect the adjustment of the tension.

4. In an embroidering-machine, the combination of a balanced fabric-frame with means for automatically varying the tension set into action by abnormal movements of the fabric-frame and means for restoring the parts to their initial positions and for locking the same in said initial positions.

5. In an embroidering-machine, the combination of a fabric-frame, supporting mechanism therefor, a spring counterbalancing mechanism for the said frame and an automatic compensating device for compensating for the irregular tension of the spring mechanism at different periods of its stress, comprising in its structure interlocking clutch-shifting devices and means for automatically restoring the said interlocking clutch-shifting devices to their initial positions.

6. In an embroidering-machine, the combination of a fabric-frame, supporting mechanism therefor, a spring counterbalancing mechanism for the said frame and an automatic compensating device for compensating for the irregular tension of the spring mechanism at different periods of its stress, comprising in its structure a rotary device for changing the spring tension and interlocking clutch-shifting devices for shifting the clutches to produce a movement of the rotary device in one direction or the other.

7. In an embroidering-machine, the combination of a fabric-frame, supporting mechanism therefor, a counterbalancing mechanism for the said frame and an automatic compensating device for compensating for the irregular tension of counterbalancing mechanism on the frame at different periods of its stress, a rotary adjusting means for adjusting the tension, normally stationary idlers constantly in engagement with the said rotary means, a source of rotary motion and means for engaging one or the other of the idlers for rotation.

8. In an embroidering-machine, the combination of a fabric-frame, supporting mechanism therefor, a counterbalancing mechanism for the said frame and an automatic compensating device for compensating for the irregular tension of the counterbalancing mechanism at different periods of its stress, a rotary adjusting means for adjusting the tension, idlers constantly in engagement with the said rotary means, a source of rotary motion and means for engaging one or the other of the idlers for rotation, comprising in its structure interlocking clutch-shifting devices and automatic means for effecting the unlocking and interlocking of the clutch-shifting devices.

9. In an embroidering-machine, the combination of a fabric-frame, a supporting mechanism therefor, a counterbalancing mechanism for the frame and a rotating compensating device for compensating for the inequalities of the counterbalanced mechanism during varying periods of its stress, comprising in its structure normally stationary idlers constantly in engagement with the rotating compensating device and automatically-operated means for driving one idler or the other to transmit motion to the compensating device.

10. In an embroidering-machine, the combination of a fabric-frame, a supporting mechanism therefor, a counterbalanced mechanism and a rotating compensating device for compensating for the irregularities of the counterbalanced mechanism during varying periods of its stress, clutch mechanism for effecting the rotation of the compensating device and automatically-operated interlocking levers for effecting the shifting of the clutch mechanism, substantially as described.

11. In an embroidering-machine, the combination of a counterbalanced fabric-frame and a rotary compensating device for the counterbalancing mechanism normally inactive, means for effecting the rotation thereof and means for maintaining the rotary parts in action until they are disengaged automatically and means independent of the rotary parts for disengaging the same from their driving means.

12. In an embroidering-machine, the combination of a fabric-frame, supporting mechanism therefor, a counterbalancing mechanism for the said frame and an automatic compensating device for compensating for the irregular tension of the counterbalancing mechanism at different periods of its stress, a series of tripping means and an abutment moving in harmony with the movements of the fabric-frame for operating the tripping means upon abnormal movements of the fabric-frame.

13. In an embroidering-machine, the combination of a fabric-frame, supporting mechanism therefor, a spring counterbalancing mechanism for the said frame and an automatic compensating device for the inequalities of the tension of the spring mechanism at different periods of its stress, a movable clutch-shifting arm, converging guideways for guiding the movement of one end of the said arm and automatically-operated means for permitting the arm to be guided by one guideway or the other.

14. In an embroidering-machine, the combination of a fabric-frame, supporting mechanism therefor, a counterbalancing mechanism for the said frame and an automatic compensating device for compensating for the unequal tension of the counterbalancing mechanism at different periods of its stress, locking mechanism for locking the compensating mechanism inoperative and mechanism for governing the action of the locking mechanism.

15. In an embroidering-machine, the combination of a balanced fabric-frame and automatic means for governing the tension thereon under abnormal movements of the frame, comprising a driving device moving in one direction only and means for transmitting therefrom movements in either one of two directions to the governing means for the tension.

16. In an embroidering-machine, the combination of a balanced fabric-frame and automatic means for governing the tension thereon under abnormal movements of the frame, comprising a driving device moving in one direction only and coupling mechanism independent of the driving device for determining the direction of motion of the governing means.

17. In an embroidering-machine, the combination of a balanced fabric-frame and automatic means for governing the tension thereon under abnormal movements of the frame, comprising a driving device moving in one direction only, coupling mechanism independent of the rotating device for determining the direction of motion of the governing means and restoring mechanism for restoring the parts to normal positions.

18. In an embroidering-machine, the combination of a balanced fabric-frame and automatic means for governing the tension thereon under abnormal movements of the frame and locking means for locking the parts of the automatic governing means in their governing positions until a change of tension renders restoration to normal position desirable.

19. In an embroidering-machine, the combination of a balanced fabric-frame and automatic means for governing the tension thereon under abnormal movements of the frame, locking means for locking the parts in their governing positions and automatically-operated means for restoring the parts to their normal positions.

20. In an embroidering-machine, the combination of a balanced fabric-frame and automatic means for governing the tension thereon under abnormal movements of the frame, comprising a rotating device driven in one direction only and automatic means governed by the movement of the fabric-frame for transmitting therefrom movements in either one of two directions to the governing means for the tension.

21. In an embroidering-machine, the combination of a balanced fabric-frame and automatic means for governing the tension thereon under abnormal movements of the frame, comprising a rotative device driven in one direction only, coupling mechanism independent of the rotating device for determining the direction of motion of the governing means, restoring mechanism for restoring the parts to normal positions and interlocking mechanism for holding the parts in said normal positions.

22. In a machine for producing patterns, the combination of a counterbalancing device for a pattern-producing element thereof, automatic means for governing the tension capable of being driven in different directions, a rotating element normally driven in one direction only and means for deriving motion in either of two directions from the rotating element and transmitting the same to the automatic governing means.

23. A tension-governing device comprising the combination of a rotating device with means for rotating the same in one direction only, a means for regulating the tension and means governed by the movement of a pattern-producing element for connecting the regulating means with the rotating device and transforming the motion to produce motion of the regulating device in one direction or the other.

24. In a tension-regulating mechanism in combination, a spring, a single shaft adapted to vary the tension on the spring, a wheel driven in one direction only and means for transmitting motion in two directions from said last-mentioned wheel to the single shaft.

25. In combination, a counterbalanced pattern-forming element of an embroidering-machine, a shaft, a connection intervening between the shaft and a pattern-forming element, a wheel driving the shaft, a wheel driven in one direction only and means intervening between the said wheels for effecting the driving of the shaft in one direction or the other.

26. The combination of a counterbalanced pattern-forming element, a rotating shaft connected thereto and partaking of the movement thereof, a wheel within which the shaft slides freely and means for driving the said wheel in either of two directions.

27. The combination of a counterbalanced pattern-forming element, a rotating shaft connected thereto and having a longitudinal movement, a wheel in which the shaft moves freely longitudinally, a slidable coupling between the shaft and wheel and means for driving the said wheel in either of two directions.

28. A tension-regulating device comprising the combination, of a rotating and longitudinally-moving shaft for regulating the tension, a coupling device connected to the shaft but not partaking of the longitudinal movement thereof and means for driving the shaft in either of two directions.

29. In a balancing device for fabric-frames of embroidering-machines, the combination of means for balancing the fabric-frame, a compensating device for the balancing means with means for adjusting the same comprised in part by a clutch and automatic means independent of the clutch for stopping the operation of the adjusting means.

30. In a balancing device for fabric-frames of embroidering-machines, the combination of means for balancing the fabric-frame, a compensating device for the balancing means with means for adjusting the same and automatic means for stopping the operation of the adjusting means and for stopping the embroidering-machine.

31. The combination with compensating mechanism for the balancing mechanism of the fabric-frame of an embroidering-machine of an automatic stop-motion operatively connected to the compensating mechanism and actuated thereby upon abnormal movements of the fabric-frame of the embroidering-machine.

32. The combination of an embroidering-machine provided with a fabric-frame-balancing mechanism, an adjusting mechanism for setting the balancing mechanism in action and means for disconnecting the adjusting mechanism when the normal tension has been restored.

33. The combination of an embroidering-machine provided with a fabric-frame-balancing mechanism, an adjusting mechanism for the balancing mechanism, a tripping-lever and means for actuating the said tripping-lever when the normal tension has been restored to disconnect the adjusting mechanism.

34. The combination of an embroidering-machine provided with balancing mechanism for the fabric-frame thereof, an adjusting mechanism for the balancing mechanism, a disconnecting device for disconnecting the adjusting mechanism, which disconnecting mechanism is in an operative position only while the tension is being restored.

35. The combination of an embroidering-machine provided with balancing mechanism for the fabric-frame thereof, an adjusting mechanism for the balancing mechanism, a tripping-lever for disconnecting the adjusting mechanism provided with a sliding face with means for bringing the sliding face into action only while the tension is being restored.

36. The combination with an embroidering-machine provided with balancing mechanism for the fabric-frame thereof, of an adjusting mechanism for the fabric-frame and a driving-wheel therefor provided with a cam to effect the disconnection of the driving mechanism.

37. In an embroidering-machine, the combination of a fabric-frame, a parallel-motion device for supporting the fabric-frame for action, a counterbalancing mechanism and an adjusting mechanism for adjusting the stress exerted by the counterbalancing mechanism to compensate for the irregularities in the action of the parallel-motion device due to its changes of position.

38. The combination with an embroidering-machine having a parallel-motion supporting device for its fabric-frame and a tension device of means intervening between the tension device and the parallel-motion device for compensating for the irregularities in tension caused by the changes of position of the parallel-motion device.

39. The combination with an embroidering-machine provided with a parallel-motion supporting device for its fabric-frame and a tension mechanism therefor of a rotating screw-shaft, a tripping-arm coöperating with said tension device carried by the screw-shaft and connected to the said screw-shaft by compensating arrangement for the purpose of varying the normal tension of the tension device according to the position of the parallel-motion device.

JOSEPH A. GROEBLI.

Witnesses:
GEO. E. MORSE,
OTTO V. SCHRENK.